US008215691B2

(12) United States Patent
Ewing (10) Patent No.: US 8,215,691 B2
(45) Date of Patent: Jul. 10, 2012

(54) CARGO ACCESS AND RETENTION SYSTEM FOR A PASSENGER VEHICLE

(75) Inventor: Kip Alan Ewing, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/767,129

(22) Filed: Apr. 26, 2010

(65) Prior Publication Data

US 2010/0201151 A1    Aug. 12, 2010

Related U.S. Application Data

(62) Division of application No. 11/844,658, filed on Aug. 24, 2007, now abandoned.

(51) Int. Cl.
*B60P 3/34* (2006.01)

(52) U.S. Cl. ............. 296/26.02; 296/146.13; 296/26.01; 293/117

(58) Field of Classification Search .................... 296/76, 296/146.13, 26.01, 53, 57.11, 146.8, 50, 296/51, 26.05, 26.15, 26.02, 146.03; 293/117
See application file for complete search history.

(56) References Cited

U.S. PATENT DOCUMENTS

| | | | |
|---|---|---|---|
| 2,442,266 A | 5/1948 | Davis | |
| 3,170,714 A | 2/1965 | Stalker | |
| 3,432,954 A | 3/1969 | Ford | |
| 3,627,158 A | 12/1971 | Kobasic | |
| 3,713,472 A | 1/1973 | Dozois | |
| 3,749,440 A * | 7/1973 | Lathers | 296/51 |
| 3,902,752 A | 9/1975 | Pelletier | |
| 3,905,637 A | 9/1975 | Smith | |
| 4,184,709 A | 1/1980 | Kim | |
| 4,413,854 A * | 11/1983 | Hirshberg | 296/146.8 |
| 4,434,919 A | 3/1984 | Flowers | |
| 4,630,982 A | 12/1986 | Fenner | |
| 4,664,437 A | 5/1987 | Queveau | |
| 4,688,844 A * | 8/1987 | Hirose et al. | 296/76 |

(Continued)

FOREIGN PATENT DOCUMENTS

DE    10033767 A1    1/2002

(Continued)

OTHER PUBLICATIONS

China Office Action and English translation for corresponding Chinese Application No. 200810144709.3, mailed Sep. 18, 2009, 16 pages.

(Continued)

*Primary Examiner* — Glenn Dayoan
*Assistant Examiner* — Pinel Romain
(74) *Attorney, Agent, or Firm* — Brooks Kushman P.C.; Greg P. Brown (57) ABSTRACT

An improved access and retention system for sedans includes a protective cover for safeguarding a lower peripheral region of a rear cargo region while loading, unloading, and transporting cargo. The protective cover can conveniently and remotely stow within the cargo region. An integral tie-down assembly, exposed by deploying the protective cover, secures cargo loaded in the rear cargo region and cargo placed along the protective cover. The system also includes a double hinging rear closure member which has a rear facing portion which can be locked in open and closed positions. Arranging the rear facing portion in the open position is particularly advantageous for hauling oversized cargo articles which may extend from the rear of the vehicle.

18 Claims, 9 Drawing Sheets

U.S. PATENT DOCUMENTS

| | | | |
|---|---|---|---|
| 4,842,458 | A | 6/1989 | Carpenter |
| 5,129,678 | A | 7/1992 | Gurbacki |
| D354,264 | S | 1/1995 | McCoy |
| D354,937 | S | 1/1995 | Nentwich |
| 5,423,644 | A | 6/1995 | First, Sr. |
| D360,177 | S | 7/1995 | Derrington |
| 5,547,187 | A | 8/1996 | Spykerman |
| 5,608,951 | A | 3/1997 | Chou |
| 5,674,033 | A | 10/1997 | Ruegg |
| 5,692,792 | A * | 12/1997 | Klar (minor) .............. 296/26.02 |
| 5,810,415 | A | 9/1998 | Vogel |
| 5,915,900 | A | 6/1999 | Boltz |
| 5,945,194 | A | 8/1999 | Pester |
| 6,039,520 | A | 3/2000 | Cheng |
| 6,112,360 | A | 9/2000 | Kalm et al. |
| 6,174,015 | B1 * | 1/2001 | Shave ............................ 296/56 |
| 6,196,612 | B1 * | 3/2001 | Grimes ...................... 296/65.05 |
| 6,196,623 | B1 | 3/2001 | Shackelford et al. |
| 6,318,782 | B1 | 11/2001 | Suzuki et al. |
| 6,361,097 | B1 | 3/2002 | Lechkun |
| 6,439,633 | B2 | 8/2002 | Nemoto |
| 6,454,341 | B2 * | 9/2002 | Tolinski ........................ 296/106 |
| 6,471,279 | B2 | 10/2002 | Pommeret |
| 6,471,284 | B2 * | 10/2002 | Landmesser ............... 296/146.8 |
| 6,505,882 | B1 * | 1/2003 | Morbach et al. ......... 296/146.11 |
| 6,644,707 | B2 | 11/2003 | McLaughlin et al. |
| 6,663,156 | B1 * | 12/2003 | Kincaid et al. ................ 296/39.1 |
| 6,707,173 | B2 * | 3/2004 | Bauman et al. ............ 310/12.27 |
| 6,755,383 | B2 | 6/2004 | Davis |
| 6,783,170 | B1 | 8/2004 | Van Den Acker et al. |
| 6,783,311 | B2 | 8/2004 | Sauerwald |
| 6,793,449 | B1 | 9/2004 | Simpson et al. |
| 6,846,140 | B2 | 1/2005 | Anderson et al. |
| 6,880,879 | B2 | 4/2005 | Pickard |
| 6,889,880 | B2 | 5/2005 | Albaisa et al. |
| 6,984,095 | B2 | 1/2006 | Johnson |
| 7,160,069 | B2 | 1/2007 | Adams |
| 7,185,451 | B2 * | 3/2007 | Tsuchizaki ..................... 40/211 |
| 7,332,636 | B2 | 2/2008 | Xu et al. |
| 7,334,833 | B2 * | 2/2008 | Koelbl et al. .............. 296/146.8 |
| 7,354,095 | B2 | 4/2008 | Fleming et al. |
| 7,401,832 | B2 | 7/2008 | Yui et al. |
| 7,513,556 | B2 | 4/2009 | Tomasson |
| 7,651,148 | B2 | 1/2010 | Hustyi et al. |
| 7,735,890 | B2 | 6/2010 | Pollak |
| 7,762,608 | B2 | 7/2010 | Gersmann et al. |
| 2003/0038497 | A1 | 2/2003 | Fitzgerald |
| 2004/0228699 | A1 | 11/2004 | Venton-Walters et al. |
| 2006/0181108 | A1 * | 8/2006 | Cleland et al. ............. 296/146.4 |
| 2007/0018475 | A1 | 1/2007 | McGinnis et al. |
| 2007/0029827 | A1 | 2/2007 | Meyer |
| 2007/0046060 | A1 | 3/2007 | Werner |
| 2007/0170739 | A1 | 7/2007 | Sims |
| 2007/0261310 | A1 * | 11/2007 | Porat et al. ...................... 49/340 |
| 2008/0191507 | A1 | 8/2008 | Farber |
| 2009/0167048 | A1 * | 7/2009 | Luca et al. ....................... 296/76 |
| 2009/0243329 | A1 | 10/2009 | Hustyi et al. |

FOREIGN PATENT DOCUMENTS

| | | |
|---|---|---|
| DE | 10038604 A1 | 2/2002 |
| KR | 20040037866 A | 5/2004 |
| KR | 20040083280 A | 10/2004 |
| KR | 20050049046 A | 5/2005 |
| KR | 20050070517 A | 7/2005 |
| WO | 2006051431 A1 | 5/2006 |

OTHER PUBLICATIONS

China Office Action and English translation of corresponding Chinese Application No. 200810144709.3, mailed Mar. 16, 2011, 12 pages.

* cited by examiner

CARGO ACCESS AND RETENTION SYSTEM FOR A PASSENGER VEHICLE

CROSS-REFERENCE TO RELATED APPLICATIONS

This application is a division of U.S. application Ser. No. 11/844,658 filed Aug. 24, 2007, now abandoned, the disclosure of which is incorporated in its entirety by reference herein.

BACKGROUND OF THE INVENTION

1. Field of the Invention

The invention relates generally to motor vehicle features which aid loading, unloading, and transporting articles in the cargo region of a sedan.

2. Background Art

Conventional sedan vehicles did not offer the functionality and versatility as they do today. Traditionally, sport utility vehicles (SUVs), minivans, station wagons, and crossovers were the ideal choice for hauling oversized or numerous pieces of luggage. Today, sedans are closing the gap and becoming more efficient for transporting larger cargo loads with competitive gas mileage.

With an increase in size and quantity of articles being loaded to and from the rear cargo region of sedans, the risk increases for users to scratch the vehicle bumper fascia or harm the rear closure latch assembly. Articles being loaded and unloaded from the cargo region can be damaged or cause damage to the bumper fascia, vehicle paint, trunk seal and latch assembly upon contact. Bumper fascias have become aesthetic features of present day vehicles, and scratches and chipped paint can be costly to correct.

While folding rear seats and vehicle packaging improvements have contributed to the ability of sedans to haul large objects, most sedans struggle in transporting elongate articles. Many drivers attempt to stow these elongated objects extending from the trunk over the front console and up into the front dash. This practice can lead to obstructed driver views, scrapes along the front dash and console, and is impracticable for loading and unloading the object. Also, when elongate articles are stowed extending from the trunk, the trunk is left open with the trunk lid blocking a rear field of view of the driver.

SUMMARY OF THE INVENTION

One embodiment of the invention involves a protective cover operably attached to an interior surface of the vehicle cargo region. The protective cover has a deployed position in which it extends across the vehicle bumper fascia and a stowed position in which the protective cover stows beneath the floor of the rear cargo region. The protective cover in the deployed position may protect the bumper fascia, and the cargo being loaded and unloaded from the rear cargo region. The protective cover may have a first cover portion pivotally connected to a rear wall of the cargo region. The first cover portion is sized to extend to the load floor in the stowed position and sized to extend to a lower peripheral region of a rear vehicle opening in an deployed position. The protective cover may have a second cover portion extending from the first cover portion at an angle such that the second cover portion extends through the rear vehicle opening over the lower peripheral region in the deployed position.

Another embodiment discloses a tie-down assembly concealed beneath the protective cover in the stowed position. Upon deploying the protective cover, the tie-down assembly is exposed and can be used for securing cargo extending across the protective cover.

Another embodiment of the improved access system discloses a rear closure for selectively enclosing a rear opening which provides access to the rear cargo region. The rear closure may have two primary members. The first member is pivotally attached to the vehicle body while the second member is pivotally attached to the first member at a substantial edge of the rear cargo region. The second member may be locked in open and closed positions, the open position of which is particularly advantageous for hauling oversized cargo.

Other aspects, features, and uses of the disclosed invention will become apparent to one skilled in the art from a study of the following description and associated drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to utilize the present invention.

Figure 1:
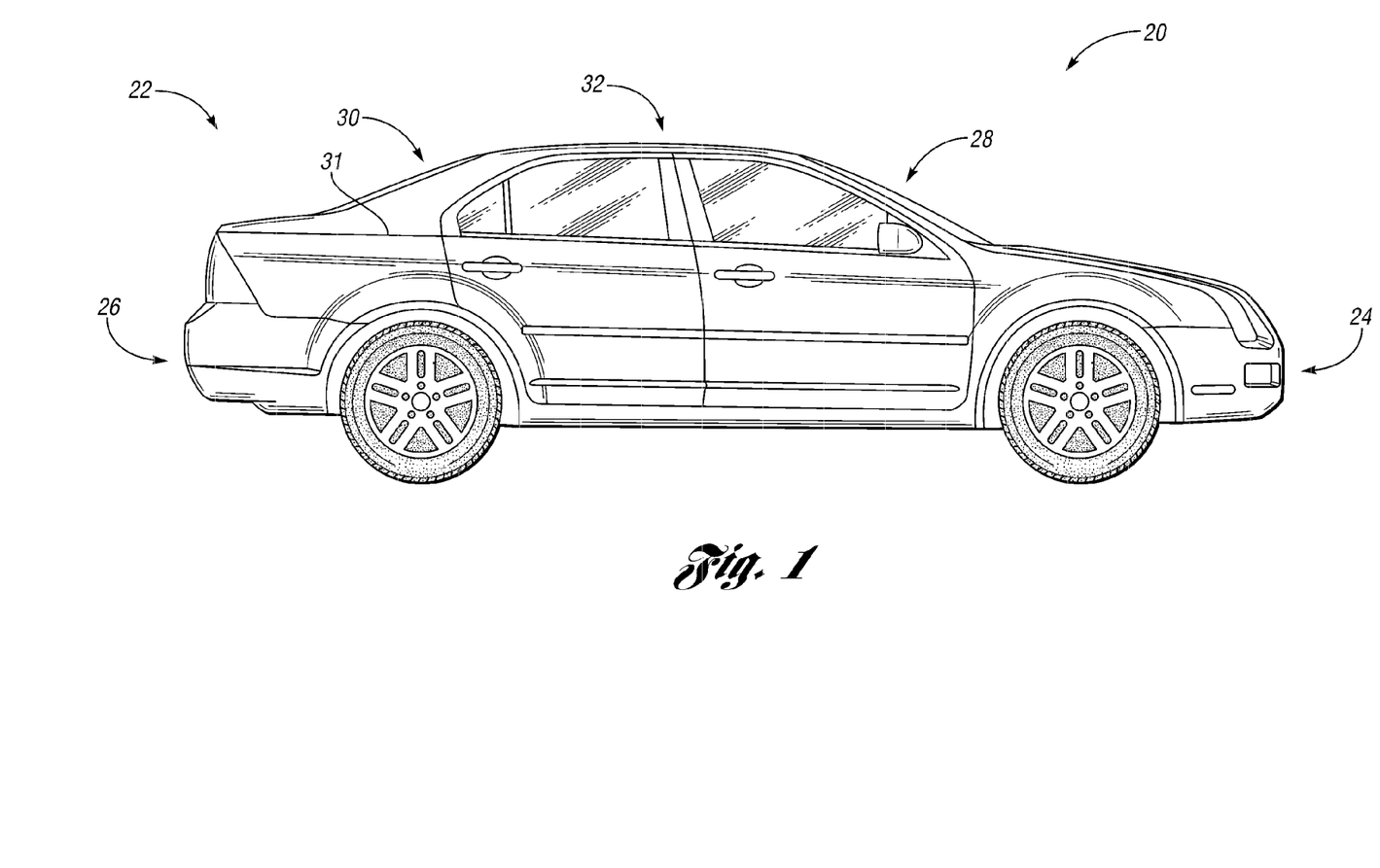
FIG. 1 is a side elevation view of a vehicle.

Referring to FIG. 1, a vehicle body, referenced generally by numeral 20, is illustrated for an embodiment having an improved cargo access and retention system 22 which does not unduly affect vehicle aesthetics, complexity, or performance. The vehicle body 20 has a shape generally defined by a front end 24, a rear end 26, and front pillars 28 and rear pillars 30 extending from a vehicle beltline 31 to support a roof member 32.

Figure 2:
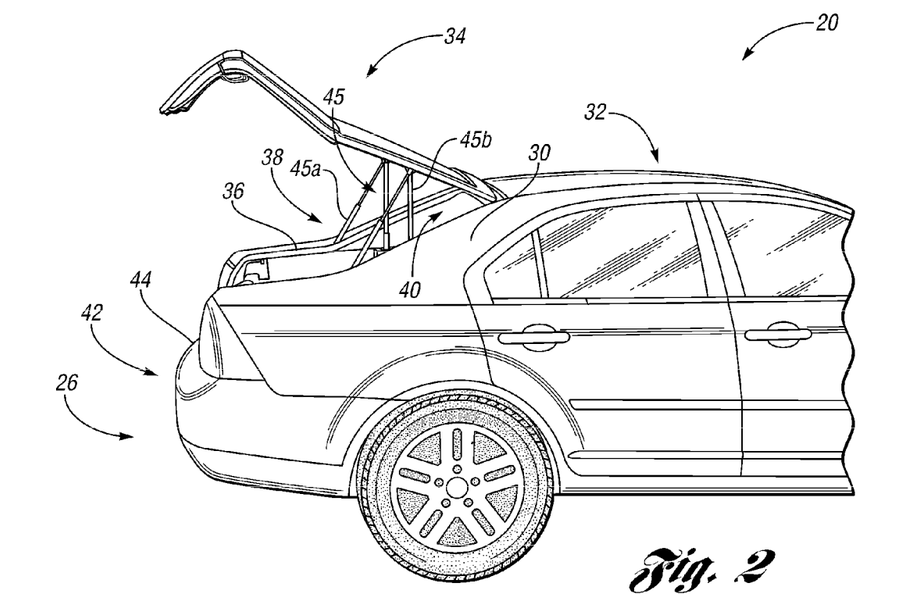
FIG. 2 is a partial side perspective view of the vehicle of FIG. 1 illustrating a member of a rear closure hatch in an open position and another member of the rear closure hatch in a closed position.

Referring now to FIG. 2, a rear closure member 34 is pivotally connected to the vehicle body 20 at a location substantially adjacent to the roof member 32 and between the rear pillars 30. The rear closure member 34 is also capable of a closed position and is shown in an open position for selectively enclosing a rear vehicle opening 36. The rear vehicle opening 36 provides access to a rear cargo region 38 contained within the interior of the vehicle body 20. The rear closure member 34 also selectively encloses a hatch portion 40 of the rear vehicle opening 36 which is disposed between the rear pillars 30. The vehicle body 20 includes a rear bumper 42 located along the rear end 26. The rear bumper 42 is adjacent to a lower peripheral region 44 which defines, in part, the rear vehicle opening 36. Additionally, extension members 45 may assist in opening and maintaining the rear closure member 34 in an open position. The extension members 45, in one embodiment, are gas shocks. In another embodiment, the extension members 45 include a pair of gas shocks 45a and a pair of electric actuators 45b that are controlled for automating opening and closing of the rear closure member 34. Alternatively, pneumatic or hydraulic cylinders can be employed for actuating the rear closure member 34.

Figure 3:
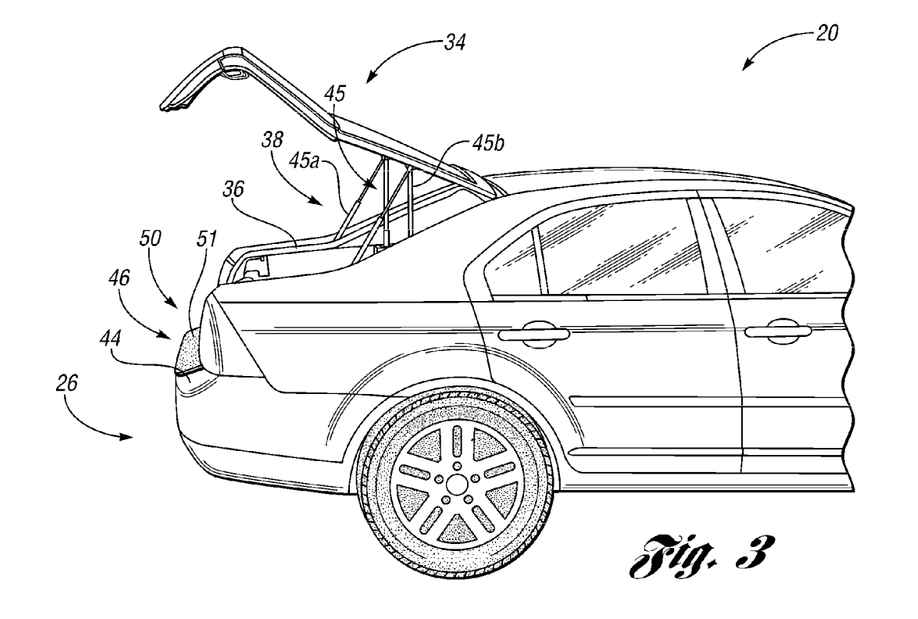
FIG. 3 is another partial side perspective view of the vehicle of FIG. 1 illustrating a protective cover in a deployed position.

Referring now to FIG. 3, the improved cargo access and retention system 22 in one embodiment features a protective cover 46 shown in a deployed position 50. The protective cover 46 can be moved to a stowed position wherein the protective cover 46 remotely stows within the rear cargo region 38. The protective cover 46 is movable between these two positions via a pivot 47, shown in FIG. 4, within the rear cargo region 38.

Figure 4:
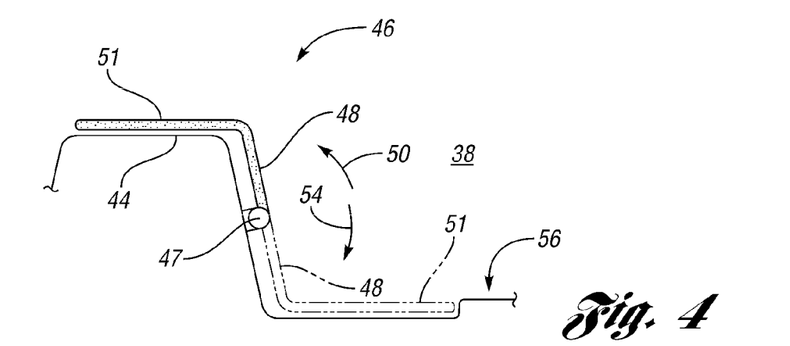
FIG. 4 is a partial section view of the vehicle of FIG. 1 illustrating the protective cover in the deployed position and outlining its placement in a stowed position.

As shown in FIG. 4, the protective cover 46 includes a first cover portion 48 which is sized to extend to a load floor 56 in the stowed position 54 and sized to extend to the lower peripheral region 44 in the deployed position 50. The protective cover 46 further includes a second cover portion 51 which in the deployed position 50 extends through the rear vehicle opening 36 and along the lower peripheral region 44 to support cargo during loading, unloading, and transporting. The pivot 47 allows the protective cover 46 to be quickly and effortlessly moved between the stowed position 54 and the deployed position 50.

In another embodiment, the protective cover 46 is detachable. If the rear cargo region 38 is loaded to maximum capacity with the protective cover 46 in the deployed position 50, it may be difficult to return the protective cover 46 to its stowed position 54 prior to closing the rear closure member 34. The protective cover 46 may be detached from the rear cargo region 38 and alternatively stowed in another vehicular compartment for the time being.

Figure 5:
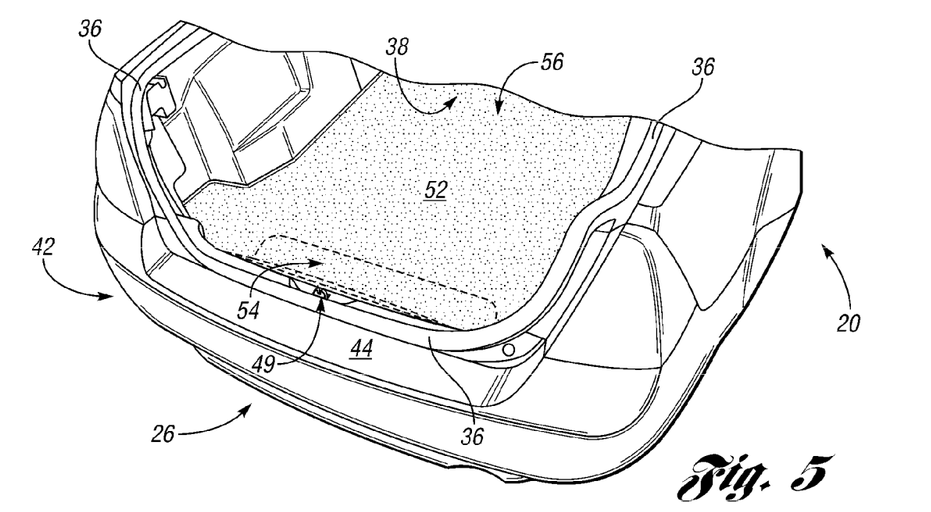
FIG. 5 is a partial rear perspective view of a rear cargo region of the vehicle of FIG. 1 illustrating the protective cover concealed in the stowed position.
Figure 6:
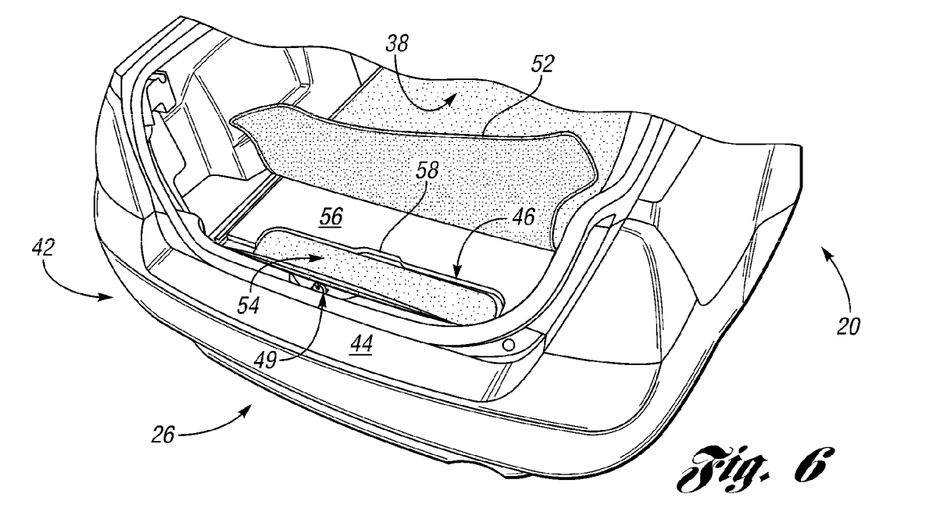
FIG. 6 is a partial rear perspective view of the rear cargo region of the vehicle of FIG. 1 illustrating a retracted load floor cover exposing the protective cover in its stowed position.

The protective cover 46 aids in sliding cargo to and from the rear cargo region 38 and guards the lower peripheral region 44 against scratches, dents, chipped paint, and the like. The protective cover 46 additionally safeguards a rear closure latch or striker member 49 which may be placed along lower peripheral region 44 as seen in FIGS. 5-6. The protective cover 46 also protects a trunk seal about the rear vehicle opening 36.

In another embodiment, the protective cover 46 helps to prevent cargo from being damaged during the loading and unloading of cargo to and from the rear cargo region 38. With bigger and longer cargo articles being loaded to and from sedans, the protective cover 46 is particularly advantageous because of its ability to support these cargo articles. This is opposed to sliding cargo articles across a traditional lower peripheral region and/or the striker member 49 of a sedan.

Due to the arrangement of the first and second cover portions 48, 51, the shape of protective cover 46 closely contours the vehicle body 20, and more specifically, the lower peripheral region 44. The protective cover 46 may additionally be substantially rigid. These characteristics cause the protective cover 46 to remain in place as cargo is slid across the protective cover 46 to and from the rear cargo region 38.

Referring again to FIGS. 3-4, the protective cover 46 is relatively small compared to the size of the rear vehicle opening 36. Thus the protective cover 46 does not obstruct access to the rear vehicle opening 36. Additionally, the protective cover 46 may extend across the width of the rear vehicle opening 36, thereby providing aid for supporting, loading, unloading, and transporting relatively wide cargo articles.

Another embodiment features the second cover portion 51 of the protective cover 46 having different surfaces on its top and bottom. Different surfaces will have different coefficients of friction. It may be optimal for the second cover portion 51 to have a relatively soft or even polymeric surface contacting the lower peripheral region 44 and the striker member 49. On its flip side, it may be optimal for the second cover portion 51 to have a relatively hard and smooth surface with minimal friction for sliding and supporting cargo.

Referring now to FIG. 5, the rear cargo region 38 may further include the load floor 56 for supporting cargo placed within rear cargo region 38. On top of the load floor 56 rests a load floor cover 52 which may include a number of materials such as, for example, carpet, floor paneling, or a cargo mat. The load floor cover 52 conceals the second cover portion 51 of the protective cover 46 in the stowed position 54. The first cover portion 48 of protective cover 46 remains substantially flush against a rear wall of the rear cargo region 38 while the protective cover 46 is in both the stowed position 54 and the deployed position 50.

Due to the compact packaging of the protective cover 46 in the stowed position 54, the protective cover 46 does not consume any considerable volume within the rear cargo region 38. Further, having the protective cover 46 onboard the vehicle body 20 does not compromise aesthetics nor vehicle performance.

Moving to FIG. 6, the load floor cover 52 may be retractable such that the protective cover 46 in the stowed position 54 is accessible upon drawing back the load floor cover 52. In the depicted embodiment, the load floor cover 52 is provided by carpeting. The second cover portion 51 of the protective cover 46, being disposed in the load floor 56, may be easily grasped by a user at a recess 58 in the load floor 56.

Figure 7:
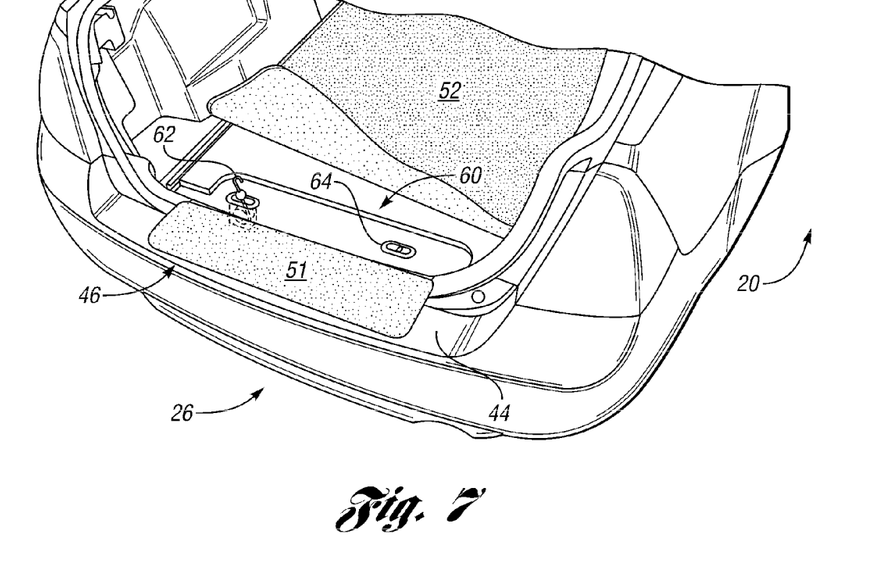
FIG. 7 is a partial rear perspective view of the rear cargo region of the vehicle of FIG. 1 illustrating the protective cover in its deployed position exposing a tie-down assembly.

Referring now to FIG. 7, the protective cover 46 may be rotated to the deployed position 50 such that the second cover portion 51 extends out of the rear vehicle opening 36 and across the lower peripheral region 44. In another embodiment, a tie-down assembly 60 may be concealed beneath the protective cover 46 in the stowed position 54. The tie-down assembly 60 may be disposed in the load floor 56 and may be exposed upon deploying the protective cover 46. The tie-down assembly 60 includes a retractable hook 62 and a recessed mount 64 in the depicted embodiment. In another embodiment, the tie-down assembly 60 includes a recessed hook and a retractable loop. Alternatively, the tie-down assembly 60 includes recessed hooks or loops.

The retractable hook 62 may be attached to a flexible tensile member which is fully coiled beneath or within the load floor 56 when not in use. The recessed mount 64 may be recessed into the load floor 56 such that the load floor 56 remains flat thereabout.

One skilled in the art will acknowledge that sedans may transport oversized cargo with an open, or partially open, trunk or hatch closure. The oversized cargo may be placed to extend out of a vehicle opening, such as rear vehicle opening 36.

Figure 8:
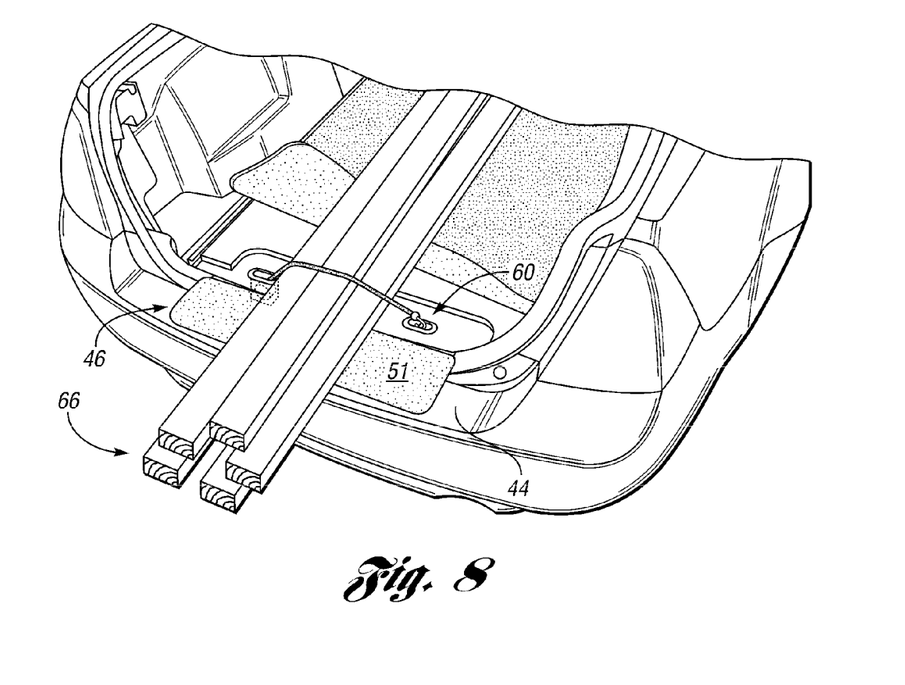
FIG. 8 is a partial rear perspective view of the rear cargo region of the vehicle of FIG. 1 illustrating the protective cover in the deployed position, and the tie-down assembly securing oversized cargo against the protective cover.

Referring to FIG. 8, the retractable hook 62 of the tie-down assembly 60 is illustrated engaging the recessed mount 64 to secure cargo articles 66. The cargo articles 66 may also rest or secure against the protective cover 46. This embodiment is considerably advantageous if hauling large cargo, especially that which may require a rear closure to be partially or completely open. The tie-down assembly 60 helps to prevent the cargo articles 66 from bouncing due to road surface imperfections. The tie-down assembly 60 may also prevent the cargo articles 66 from sliding towards or out of the rear end 26 of the vehicle body 20.

In another embodiment, the retractable hook 62 may further include a ratchet (not shown) for additionally tightening the tie-down assembly 60 about cargo articles 66.

Another embodiment may involve a plurality of hooks or loops, such as retractable hook 62, and a corresponding plurality of mounts, such as recessed mount 64.

Figure 9:
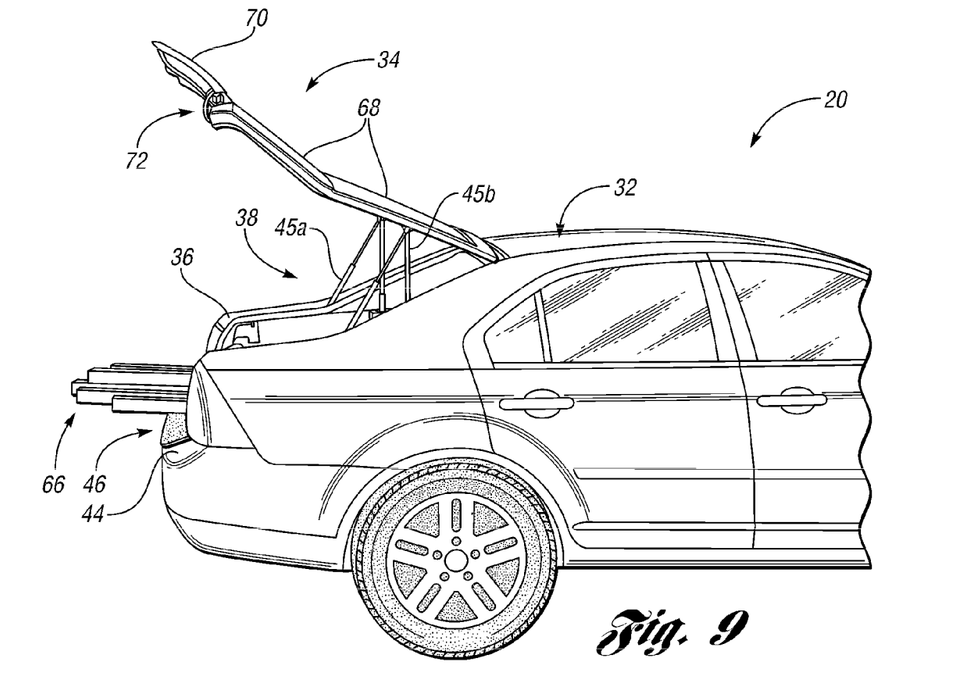
FIG. 9 is a partial side perspective view of the vehicle of FIG. 1 illustrating the first and second members of the rear closure hatch in open positions and oversized cargo extending across the deployed protective cover and out the rear end of the vehicle.

Referring now to FIG. 9, the rear cargo region 38 is loaded with cargo articles 66 extending across the protective cover 46 in the deployed position 50. The rear closure member 34 is open providing access to the rear vehicle opening 36. The rear closure member 34 includes a first hatch portion 68 which is a panel pivotally connected to the vehicle body 20 at a location commonly adjacent to the roof member 32. The rear closure member 34 further includes a second hatch portion 70 which is a panel pivotally connected to the first hatch portion 68 via a pivotal connection 72. The second hatch portion 70, shown secured in an open position, can also be secured in a closed position pending on the desired vehicular application. The second hatch portion 70 may be movable between open and closed positions when the first hatch portion 68 is both open and closed.

While the locking and pivoting functions of the second hatch portion 70 are facilitated by the pivotal connection 72, one skilled in the art will recognize that these first and second portions, along with the first hatch portion 68 and the vehicle body 20, may be connected in a variety of ways.

Figure 10:
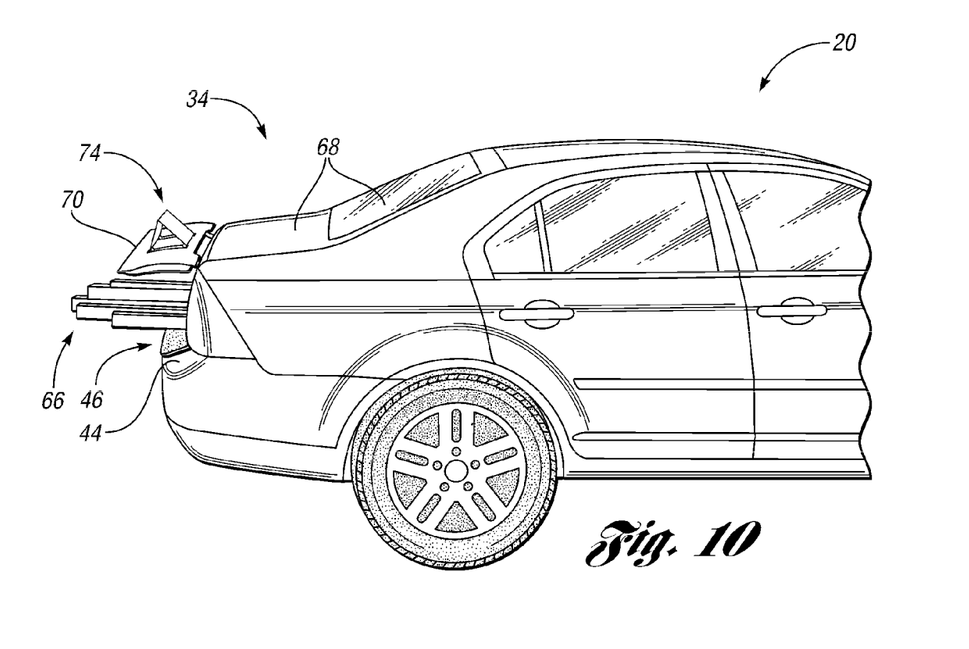
FIG. 10 is a partial side perspective view of the vehicle of FIG. 1 illustrating the second member of the rear closure hatch secured in an open position, oversized cargo extending across the deployed protective cover and out the rear end of the vehicle, and a license plate bracket in an extended position.

The rear closure member 34 may be selectively opened and closed in a variety of ways. As fully opened in FIG. 9, the first hatch portion 68 may be closed while maintaining the second hatch portion 70 in a locked open position as seen in FIG. 10. Rear closure member 34, with the second hatch portion 70 locked in a closed position and the first hatch portion 68 open, as seen in FIG. 3, may also be closed against rear vehicle opening 36 in a conventional manner. The rear closure member 34 may also be opened in a conventional manner wherein the second hatch portion 70 remains closed.

In another embodiment, the rear closure member 34, as shown in FIG. 10, may be positioned with the first hatch portion 68 secured against the rear vehicle opening 36 and the second hatch portion 70 locked in an open position. The second hatch portion 70 in the open position provides access to a portion of the rear vehicle opening 36 and thus the rear cargo region 38. This arrangement allows a user to transport large or elongated cargo articles, such as cargo articles 66, without cramming cargo across the front console and into the front dash. This feature gives the driver of the vehicle a clear and unobstructed view of the surroundings because the first hatch portion 68 is closed. Thus, a rear field of view is not obstructed by an open hatch lid or trunk lid, which is common in the prior art when a hatch lid or trunk lid is left open to transport cargo.

The protective cover 46 may be utilized when the rear closure member 34 is oriented as seen in FIG. 10, with the first hatch portion 68 closed and the second hatch portion 70 locked open. Reiterating, during transportation the protective cover 46 supports cargo articles 66 and protects the lower peripheral region 44 from scratches and abrasions.

Although not shown in FIG. 10, the tie-down assembly 60 may also be incorporated during travel to help secure the cargo articles 66 to the protective cover 46. Tie-down assembly 60 will additionally aid in preventing the cargo articles 66 from sliding rearward as the vehicle body 20 accelerates, crosses rough terrain, and travels along sloped surfaces.

Most vehicle license plates are attached to sedans in a location similar to that along the second hatch portion 70 of the rear closure member 34. In the event that a user is transporting cargo articles 66 with the second hatch portion 70 locked open, the vehicle license plate is naturally concealed to surrounding vehicles. In another embodiment, a license plate bracket 74, further described below and better shown in FIG. 15, may be included to prop up the license plate and make the license plate of the vehicle body 20 visible.

Figure 11:
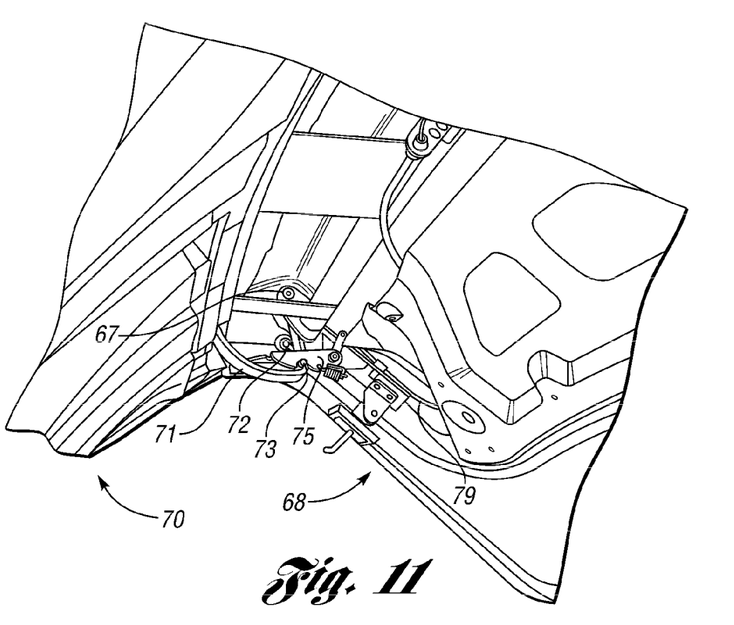
FIG. 11 is an enlarged underside perspective view of a locking mechanism for the second member of the rear closure illustrated in the closed position.
Figure 12:
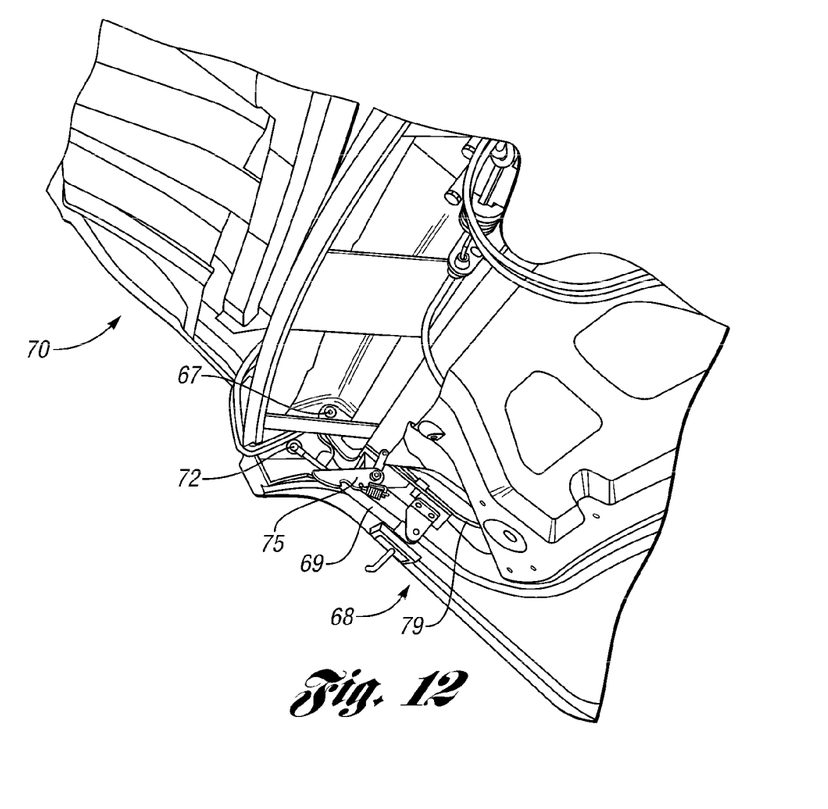
FIG. 12 is another enlarged underside perspective view of the locking mechanism illustrated securing the second member of the rear closure in the open position.
Figure 13:
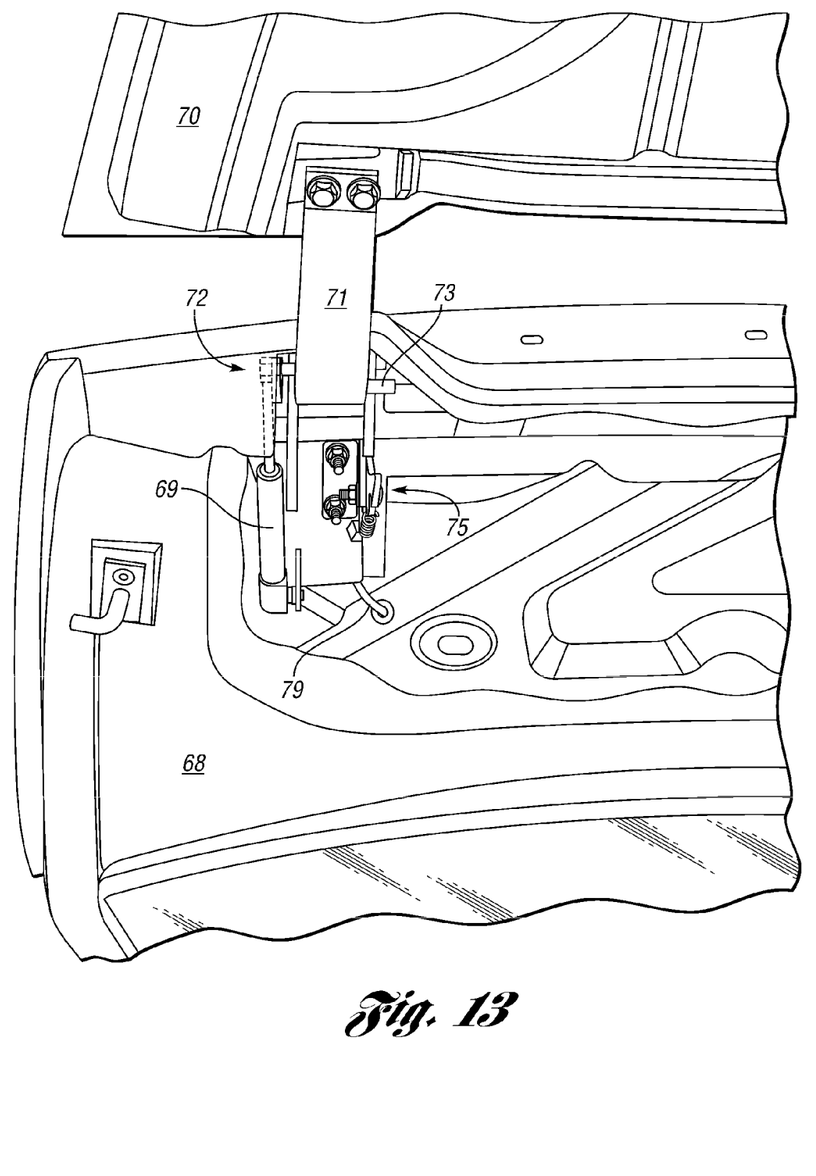
FIG. 13 is yet another enlarged underside perspective view of the locking mechanism illustrated securing the second member of the rear closure in the open position.

Now referring to FIGS. 11-13, a pivotal connection 67 for pivoting the second hatch portion 70 closed and open is shown. The second hatch portion 70 may be held open, as seen in FIGS. 12-13, with a gas shock and rod assembly 69. The gas shock and rod assembly 69 has a pivotal connection 72 disposed at an end of the rod for communicating with a bracket 71 which attaches the first and second hatch portions 68, 70. The bracket 71 also features a striker pin 73 for selective engagement with a latch 75 fixed on the first hatch portion 68. The latch 75 grasps the striker pin 73 to secure the second hatch portion 70 in the closed position as shown in FIG. 11. Accordingly, a release cable 79 disengages the latch 75 when manually or automatically actuated.

Figure 14:
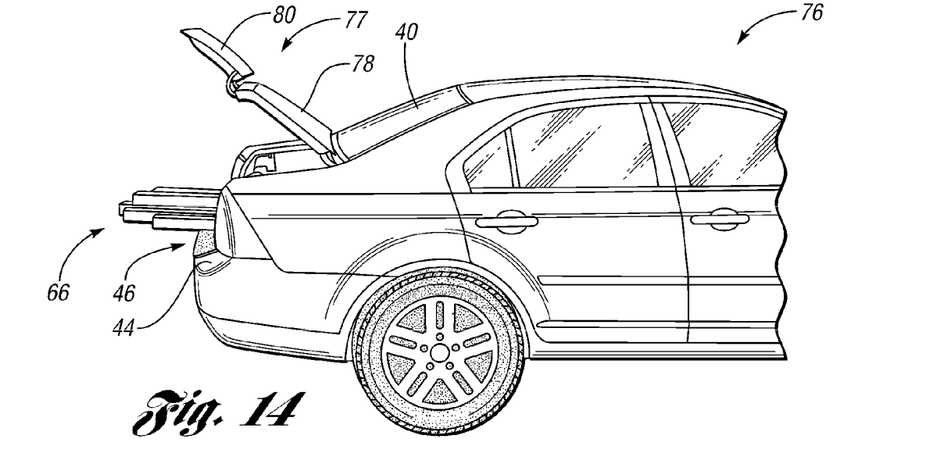
FIG. 14 is a partial side perspective view of another vehicle embodiment illustrated with a pair of members of a rear closure trunk in open positions and oversized cargo extending across a deployed protective cover and out the rear end of the vehicle.

In another embodiment, FIG. 14 shows a vehicle body 76 having a rear closure member 77 with a first trunk portion 78 pivotally connected to the vehicle body 76 and a second trunk portion 80 pivotally connected to the first trunk portion 78. The rear closure member 77 may operate in a similar fashion to that of the rear closure member 34 of prior embodiments of FIGS. 1-13. The second trunk portion 80 may be secured in both open and closed positions with movement provided by a mechanism similar in function to pivotal connection 72. A protective cover 46 may also be included to safeguard a lower peripheral region 44 during various cargo applications.

Figure 15:
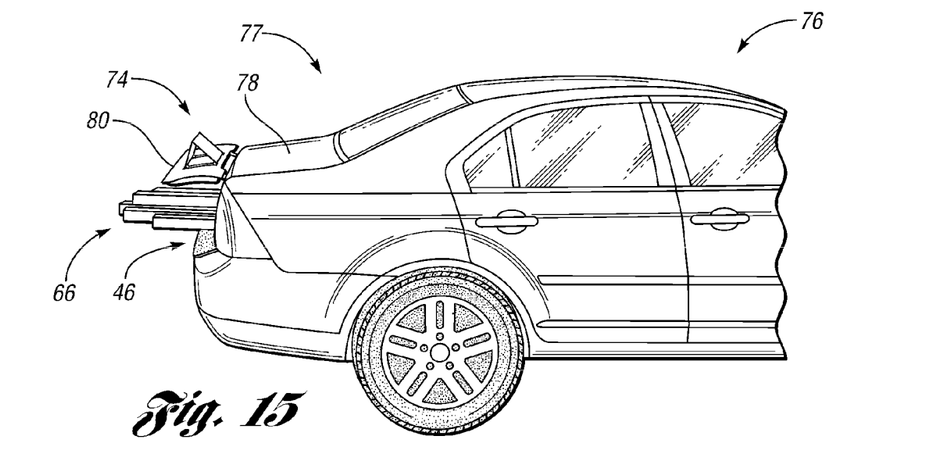
FIG. 15 is a partial side perspective view of the vehicle of FIG. 14 illustrated with the second member of the rear closure trunk in the open position, oversized cargo extending across the deployed protective cover and out the rear end of the vehicle, and a license plate bracket in an extended position.

The rear closure member 77 may also be advantageous in transporting cargo articles 66, as shown in FIG. 15. When the second trunk portion 80 is locked in an open position access to the rear cargo region 38 is provided. The cargo articles 66 may extend out from the rear cargo region 38 during transportation without inhibiting a front passenger compartment. Likewise, a tie-down assembly 60 may be included to secure the cargo articles 66 to the protective cover 46. A license plate bracket 74 can also be included for the aforementioned purposes.

Figure 16:
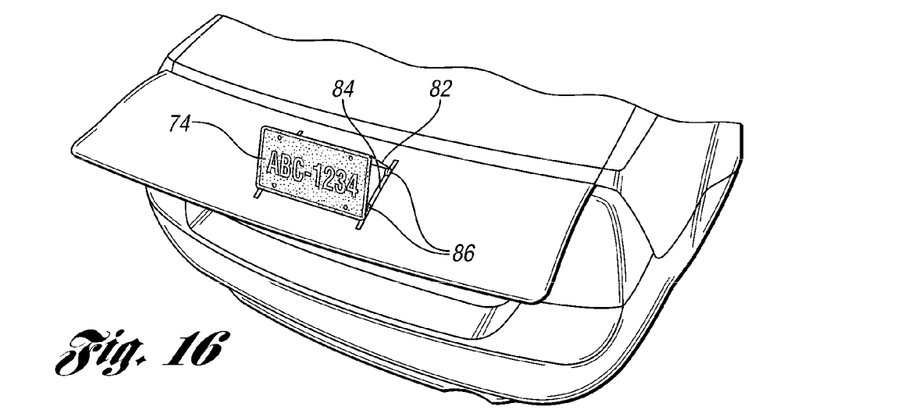
FIG. 16 is a partial rear perspective view of the license plate bracket of FIG. 15.

Now referring to FIG. 16, one embodiment of the license plate bracket 74 features a supporting member 82 hingedly attached to the license plate bracket 74 for propping up the license plate bracket 74. Both the license plate bracket 74 and the supporting member 82 may be attached to a track 84 via rollers 86. When stowed, the supporting member 82 is displaced behind the license plate bracket 74 and remains substantially flush against the rear closure member 34 or 77. When deployed, both the license plate bracket 74 and the supporting member 82 are secured along track 84. One skilled in the art will appreciate that there are many other ways to prop up a license plate for viewing.

Figure 17:
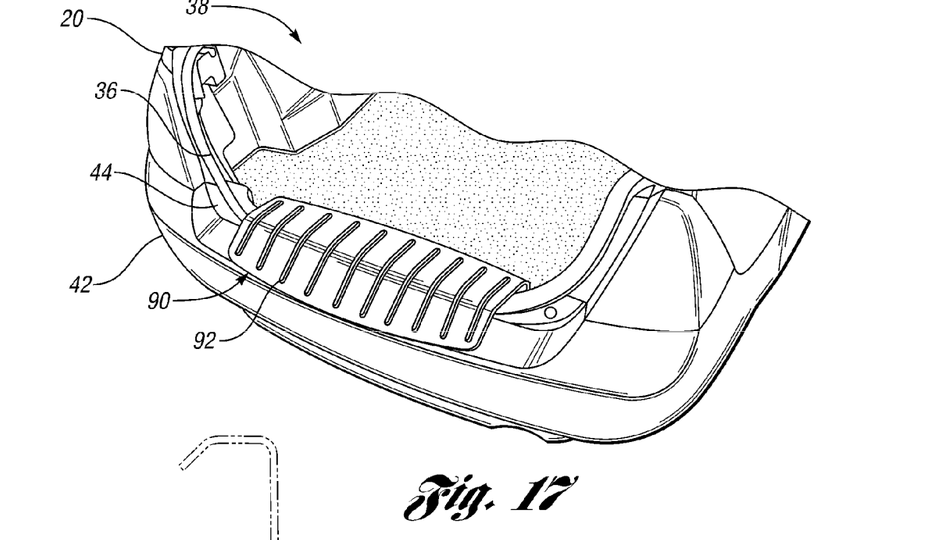
FIG. 17 is a partial rear perspective view of the rear cargo region of the vehicle of FIG. 1 illustrating another protective cover embodiment in a deployed position.

FIG. 17 illustrates an additional embodiment of a protective cover 90. The protective cover 90 features a series of ribs 92 for reducing the surface area with which cargo may come in contact during loading, unloading, and transportation. By reducing the contact area, lower friction is generated between the cargo and the protective cover 90, thereby reducing efforts required to load the cargo. The reduced contact area also yields less wear and appearance degradation of the protective cover 90.

Figure 18:
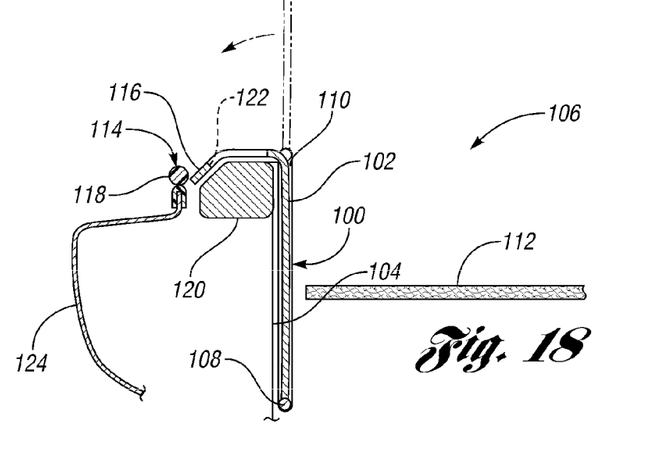
FIG. 18 is a side partial section view of a rear cargo region of the vehicle of FIG. 1 illustrating another protective cover embodiment in a stowed position.
Figure 19:
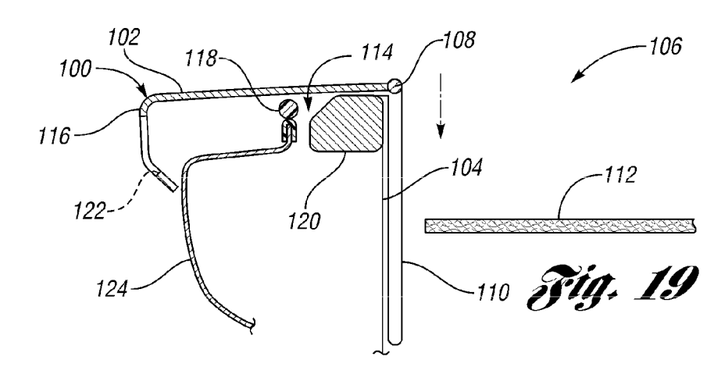
FIG. 19 is another side partial section view of the rear cargo region of FIG. 18 illustrating the protective cover in a deployed position.

With reference to FIGS. 18 and 19, another protective cover 100 embodiment is illustrated. In the stowed position, a first cover portion 102 is oriented upright adjacent to a rear wall 104 of a rear cargo region 106. The first cover portion 102 has a pair of shafts 108, each mounted on a lateral side of the first cover portion 102 and extending into a corresponding slot 110 provided in a side wall of the rear cargo region 106. The first cover portion 102 and the slot 110 extend between the rear wall 104 and a load floor 112 of the cargo region 106 for a range extending below a height of the load floor 112 and to a height oriented above a lower peripheral region 114 of a rear vehicle opening.

The protective cover 100 also includes a second cover portion 116 that extends away from the first cover portion 102. In one embodiment the second cover portion 116 extends rearward within the rear cargo region 106 adjacent to a rear opening seal 118 that is utilized for the sealing the rear opening when engaged by a corresponding hatch lid or trunk lid. Thus, the second cover portion 116 may extend over a latch assembly 120. Accordingly, the second cover portion 116 includes an aperture 122 to permit a striker of the hatch or trunk lid to extend through the second cover portion 116 to the latch assembly 120. Alternatively, the striker may be oriented beneath the second cover portion 116, and the aperture 122 permits a latch on the hatch or trunk lid to extend through the second cover portion 116.

In order to deploy the protective cover 100, the user slides the cover 100 upwards as the shafts 108 translate in the slots 110 until the shafts 108 are above the lower peripheral region 114 of the rear vehicle opening, as illustrated in phantom in FIG. 18. Then the user pivots the protective cover downward as illustrated in FIG. 19. When the protective cover 100 is deployed, the protective cover 100 extends over the latch assembly 120, seal 118 and an adjacent bumper fascia 124 thereby protecting these components from damage and concomitantly protecting the cargo from damage.

Additionally, the protective cover 100 is oriented generally perpendicular to the path of travel provided by the slot 110. This relationship adds stability to the protective cover 100 during loading. As cargo is loaded along the protective cover 100, the resistance of the cover 100 is imparted on the slots 110 in a direction perpendicular to the slots 110. Therefore, the cover 100 is less apt to move out of the deployed position when cargo is slid across it, because the resistance is perpendicular to the path of travel, provided by the slots 110.

In order to stow the protective cover 100, the cover 100 is pivoted from the deployed position in FIG. 19 to the phantom position in FIG. 18. Then the cover 100 is slid downward to the stowed position in solid in FIG. 18. This embodiment provides a compact path for stowing the cover 100. Thus, if the cargo region 106 is sufficiently loaded, the protective cover 100 can be restowed without interference with the cargo. For example, if the trunk is full, the protective cover 100 can still be stowed because the protective cover 100 does not travel in the cargo area provided by the load floor 112 and the protective cover 100 is stowed between the load floor 112 and the rear wall 104 instead of along or beneath the load floor 112.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A passenger vehicle comprising:
    a vehicle body having a front end, a rear end, a top end, a bottom end, an interior, and a rear opening having a first region facing generally upward and a second region facing generally rearward, both regions for providing access to the interior;
    a rear closure assembly for selectively enclosing the rear opening and providing access to the interior, the rear closure assembly having a first hatch member pivotally connected to the vehicle body to enclose the first region of the rear opening, the rear closure assembly having a second hatch member pivotally connected to the first hatch member at an intersection of the first and second regions of the rear opening, the second hatch member being sized to enclose the second region of the rear opening; and
    a locking mechanism connected to the first and second hatch members of the rear closure assembly for locking the second hatch member in a closed position relative to the first hatch member;

wherein the first hatch member comprises a window providing a rear field of view through the first hatch member;

wherein the second hatch member does not obstruct the rear field of view when the first hatch member is in the closed position and the second hatch member is in the open position; and wherein the locking mechanism comprises a latch and a striker pin;

wherein the first hatch member comprises a panel;

wherein the second hatch member comprises a panel; and wherein the second hatch member panel aligns with the first hatch member panel when the first hatch member panel is in the closed position and the second hatch member panel is in the open position so that the second hatch member panel does not obstruct the rear field of view while providing open access through the rear opening second region.

2. The passenger vehicle of claim 1 further comprising a license plate bracket operably attached to the second hatch member of the rear closure assembly, the license plate bracket having a first position in which the license plate bracket is displaced against the second hatch member of the rear closure assembly, the license plate bracket having a pivoted position in which the license plate bracket faces rearward when the second hatch member of the rear closure assembly is in the open position.

3. The passenger vehicle of claim 1, wherein the vehicle body further comprises a pair of front pillars extending upward from a beltline of the vehicle body, at least one roof member extending rearward from the front pillars, and a pair of rear pillars extending downward from the at least one roof member, the pair of rear pillars thereby defining an upper hatch region of the rear opening, wherein the first hatch member of the rear closure assembly encloses the upper hatch region and is operably attached to the vehicle body at a location adjacent to the roof member and between the rear pillars.

4. The passenger vehicle of claim 1, wherein the vehicle body further comprises a pair of front pillars extending upward from a beltline of the vehicle body, at least one roof member extending rearward from the front pillars, and a pair of rear pillars extending downward from the at least one roof member, wherein the first region of the rear opening defines a lower trunk region disposed generally rearward of the pair of rear pillars, and wherein the first hatch member of the rear closure assembly encloses the lower trunk region and is operably attached to the vehicle body at a location rearward of the rear pillars.

5. The passenger vehicle of claim 1 further comprising at least one extension member to assist in opening and maintaining the rear closure assembly in an open position.

6. The passenger vehicle of claim 5 wherein the at least one extension member comprises a gas shock.

7. The passenger vehicle of claim 5 wherein the at least one extension member comprises a gas shock and rod assembly.

8. The passenger vehicle of claim 5 wherein the at least one extension member comprises an actuator.

9. The passenger vehicle of claim 5 wherein the at least one extension member comprises an electric actuator.

10. The passenger vehicle of claim 1 further comprising:

a first extension member connected to the vehicle body and the first hatch member to assist in opening and maintaining the first hatch member in an open position; and a second extension member connect to the first hatch member and the second hatch member to assist in opening and maintaining the second closure member in an open position.

11. The passenger vehicle of claim 1 wherein the first hatch member is selectively pivotally connected to the vehicle body, and the second hatch member is selectively pivotally connected to the first hatch member for providing position combinations comprising the first hatch member closed and the second hatch member closed, the first hatch member open and the second hatch member closed, and the first hatch member closed and the second hatch member open.

12. The passenger vehicle of claim 11 wherein the position combinations of the first and second hatch members further comprise the first hatch member open and the second hatch member open.

13. The passenger vehicle of claim 1 further comprising a release cable operably connected to the locking mechanism for unlocking the locking mechanism.

14. The passenger vehicle of claim 1 further comprising:

a pair of front pillars extending upward from a beltline of the vehicle body;

at least one roof member extending rearward from the front pillars; and a pair of rear pillars extending downward from the at least one roof member, the pair of rear pillars thereby defining an upper hatch region of the rear opening;

wherein the first hatch member of the rear closure assembly encloses the upper hatch region and is operably attached to the vehicle body at a location adjacent to the roof member and between the rear pillars; and wherein the second hatch member of the rear closure assembly encloses the lower trunk region and is operably attached to the first hatch member at a location rearward of the rear pillars.

15. The passenger vehicle of claim 14 further comprising at least one electric actuator to assist in opening and maintaining the rear hatch assembly in an open position.

16. The passenger vehicle of claim 14 further comprising:

a first extension member connected to the vehicle body and the first hatch member to assist in opening and maintaining the first hatch member in an open position; and a second extension member connected to the first hatch member and the second hatch member to assist in opening and maintaining the second hatch member in an open position.

17. The passenger vehicle of claim 14 wherein the first hatch member is selectively pivotally connected to the vehicle body, and the second hatch member is selectively pivotally connected to the first hatch member for providing position combinations comprising the first hatch member closed and the second hatch member closed, the first hatch member open and the second hatch member closed, and the first hatch member closed and the second hatch member open.

18. A passenger vehicle comprising:

a vehicle body having a front end, a rear end, a top end, a bottom end, an interior, and a rear opening having a first region that includes a load floor facing generally upward and a second region facing generally rearward, both regions for providing access to the interior, the vehicle body having a rear bumper adjacent to a lower peripheral region of the rear opening, and the vehicle body having a rear wall extending above the load floor and defining the lower peripheral region of the rear opening;

a rear closure assembly for selectively enclosing the rear opening and providing access to the interior, the rear closure assembly having a first hatch member pivotally connected to the vehicle body to enclose the first region of the rear opening, the rear closure assembly having a second hatch member pivotally connected to the first hatch member at an intersection of the first and second regions of the rear opening, the second hatch member being sized to enclose the second region of the rear opening; and a locking mechanism connected to the first and second hatch members of the rear closure assembly for locking the second hatch member in a closed position relative to the first hatch member;

wherein the first hatch member comprises a window providing a rear field of view through the first hatch member;

wherein the second hatch member does not obstruct the rear field of view when the first hatch member is in the closed position and the second hatch member is in the open position; and wherein the locking mechanism comprises a latch and a striker pin;

a pair of front pillars extending upward from a beltline of the vehicle body;

at least one roof member extending rearward from the front pillars;

a pair of rear pillars extending downward from the at least one roof member, the pair of rear pillars thereby defining an upper hatch region of the rear opening;

wherein the first hatch member of the rear closure assembly encloses the upper hatch region and is operably attached to the vehicle body at a location adjacent to the roof member and between the rear pillars;

wherein the second hatch member of the rear closure assembly encloses the lower trunk region and is operably attached to the first hatch member at a location rearward of the rear pillars; and wherein the first hatch member is selectively pivotally connected to the vehicle body, and the second hatch member is selectively pivotally connected to the first hatch member for providing position combinations comprising the first hatch member closed and the second hatch member closed, the first hatch member open and the second hatch member closed, and the first hatch member closed and the second hatch member open; and a protective cover portion having a first cover portion pivotally connected to the rear wall and sized to extend to the load floor in a stowed position, an sized to extend to the lower peripheral region of the rear opening in a deployed position, the protective cover having a second cover portion extending from the first cover portion at a fixed angle such that the second cover portion extends from through the rear opening over the lower peripheral region in the deployed position of the protective cover and in the open position of the second hatch member.

* * * * *